US008811989B2

(12) United States Patent
Park et al.

(10) Patent No.: US 8,811,989 B2
(45) Date of Patent: Aug. 19, 2014

(54) METHOD AND APPARATUS FOR TRANSMITTING PAGING MESSAGE FOR M2M DEVICE IN WIRELESS COMMUNICATION SYSTEM

(71) Applicant: LG Electronics Inc., Seoul (KR)

(72) Inventors: Gi Won Park, Anyang-si (KR); Young Soo Yuk, Anyang-si (KR)

(73) Assignee: LG Electronics Inc., Seoul (KR)

( * ) Notice: Subject to any disclaimer, the term of this patent is extended or adjusted under 35 U.S.C. 154(b) by 43 days.

(21) Appl. No.: 13/656,626

(22) Filed: Oct. 19, 2012

(65) Prior Publication Data

US 2013/0102311 A1  Apr. 25, 2013

Related U.S. Application Data

(60) Provisional application No. 61/549,753, filed on Oct. 21, 2011.

(51) Int. Cl.
H04W 60/06 (2009.01)
H04W 68/00 (2009.01)
H04W 68/02 (2009.01)
H04W 4/00 (2009.01)

(52) U.S. Cl.
CPC .............. H04W 4/005 (2013.01); H04W 60/06 (2013.01); H04W 68/02 (2013.01); Y02B 60/50 (2013.01)
USPC ........................................ 455/435.1; 455/458

(58) Field of Classification Search
CPC ............................. H04W 60/06; H04W 68/00
USPC ............................................... 455/435.1, 458
See application file for complete search history.

(56) References Cited

U.S. PATENT DOCUMENTS

| | | | |
|---|---|---|---|
| 2012/0076085 A1* | 3/2012 | Chou | 370/329 |
| 2012/0202543 A1* | 8/2012 | Murias et al. | 455/509 |
| 2012/0257564 A1* | 10/2012 | Kim et al. | 370/312 |
| 2013/0136072 A1* | 5/2013 | Bachmann et al. | 370/329 |
| 2014/0010140 A1* | 1/2014 | Martinez Tarradell et al. | 370/312 |

* cited by examiner

Primary Examiner — Jinsong Hu
Assistant Examiner — Jean Chang
(74) Attorney, Agent, or Firm — Lee, Hong, Degerman, Kang & Waimey

(57) ABSTRACT

A method and apparatus of receiving a paging message in a wireless communication system is provided. A machine-to-machine (M2M) device monitors paging messages including a group paging message and an individual paging message, and receives both the group paging message and the individual paging message from a base station (BS).

8 Claims, 11 Drawing Sheets

METHOD AND APPARATUS FOR TRANSMITTING PAGING MESSAGE FOR M2M DEVICE IN WIRELESS COMMUNICATION SYSTEM

CROSS-REFERENCE TO RELATED APPLICATIONS

Pursuant to 35 U.S.C. §119(e), this application claims the benefit of U.S. Provisional application No. 61/549,753 filed on Oct. 21, 2011, the contents of which are all hereby incorporated by reference herein in their entirety.

BACKGROUND OF THE INVENTION

1. Field of the Invention

The present invention relates to wireless communications, and more particularly, to a method and apparatus for transmitting a paging message for a machine-to-machine (M2M) device in a wireless communication system.

2. Related Art

The institute of electrical and electronics engineers (IEEE) 802.16e standard was adopted in 2007 as a sixth standard for international mobile telecommunication (IMT)-2000 in the name of 'WMAN-OFDMA TDD' by the ITU-radio communication sector (ITU-R) which is one of sectors of the international telecommunication union (ITU). An IMT-advanced system has been prepared by the ITU-R as a next generation (i.e., 4th generation) mobile communication standard following the IMT-2000. It was determined by the IEEE 802.16 working group (WG) to conduct the 802.16m project for the purpose of creating an amendment standard of the existing IEEE 802.16e as a standard for the IMT-advanced system. As can be seen in the purpose above, the 802.16m standard has two aspects, that is, continuity from the past (i.e., the amendment of the existing 802.16e standard) and continuity to the future (i.e., the standard for the next generation IMT-advanced system). Therefore, the 802.16m standard needs to satisfy all requirements for the IMT-advanced system while maintaining compatibility with a mobile WiMAX system conforming to the 802.16e standard.

There is ongoing development on the institute of electrical and electronics engineers (IEEE) 802.16p standard optimized for machine-to-machine (M2M) communication based on the IEEE 802.16e standard and the IEEE 802.16m standard. The M2M communication can be defined as an information exchange performed between a subscriber station and a server or between subscriber stations in a core network without any human interaction. In the IEEE 802.16p standard, there is an ongoing discussion on enhancement of medium access control (MAC) of the IEEE 802.16 standard and a minimum change of an orthogonal frequency division multiple access (OFDMA) physical layer (PHY) in licensed bands. Due to the discussion on the IEEE 802.16p standard, a wide area wireless coverage is required in the licensed band, and a scope of applying automated M2M communication can be increased for an observation and control purpose.

When accessing a network, requirements demanded by many M2M applications are significantly different from requirements for human-initiated or human-controlled network access. The M2M application can include vehicular telematics, healthcare monitoring of bio-sensors, remote maintenance and control, smart metering, an automated service of a consumer device, etc. The requirements of the M2M application can include very lower power consumption, larger numbers of devices, short burst transmission, device tampering detection and reporting, improved device authentication, etc.

An M2M device receives a paging message from a network. For M2M device, group paging may be performed as well as individual paging. It is required that a method of receiving a group paging message and an individual paging message efficiently.

SUMMARY OF THE INVENTION

The present invention provides a method and apparatus for transmitting a paging message for an M2M device in a wireless communication system. The present invention provides a method of receiving both a group paging message and an individual paging message from a base station.

In an aspect, a method of receiving a paging message, by a machine-to-machine (M2M) device, in a wireless communication system is provided. The method includes monitoring paging messages, including a group paging message and an individual paging message, in a paging frame in a paging listening interval, receiving one of the group paging message and the individual paging message from a base station (BS), keeping monitoring the paging messages in the paging frame in the paging listening interval, and receiving the remaining of the group paging message and the individual paging message from the BS.

In another aspect, a method of receiving a paging message for a machine-to-machine (M2M) device in a wireless communication system is provided. The method includes monitoring paging messages including a group paging message and an individual paging message, receiving the group paging message, and receiving the individual paging message after receiving the group paging message.

DESCRIPTION OF EXEMPLARY EMBODIMENTS

A technology below can be used in a variety of wireless communication systems, such as code division multiple access (CDMA), frequency division multiple access (FDMA), time division multiple access (TDMA), orthogonal frequency division multiple access (OFDMA), and single carrier frequency division multiple access (SC-FDMA). CDMA can be implemented using radio technology, such as universal terrestrial radio access (UTRA) or CDMA2000. TDMA can be implemented using radio technology, such as global system for mobile communications (GSM)/general packet radio service (GPRS)/enhanced data rates for GSM evolution (EDGE). OFDMA can be implemented using radio technology, such as IEEE 802.11 (Wi-Fi), IEEE 802.16 (WiMAX), IEEE 802-20, or evolved UTRA (E-UTRA). IEEE 802.16m is the evolution of IEEE 802.16e, and it provides a backward compatibility with an IEEE 802.16e-based system. IEEE 802.16p is optimized for machine-to-machine (M2M) communication based on IEEE 802.16e and IEEE 802.16m. UTRA is part of a universal mobile telecommunications system (UMTS). 3rd generation partnership project (3GPP) long term evolution (LTE) is part of evolved UMTS (E-UMTS) using evolved-UMTS terrestrial radio access (E-UTRA), and it adopts OFDMA in downlink (DL) and SC-FDMA in uplink (UL). LTE-A (advanced) is the evolution of 3GPP LTE.

IEEE 802.16m and IEEE 802.16p is chiefly described as an example in order to clarify the description, but the technical spirit of example embodiments of the present invention is not limited to IEEE 802.16m and IEEE 802.16p.

Figure 1:
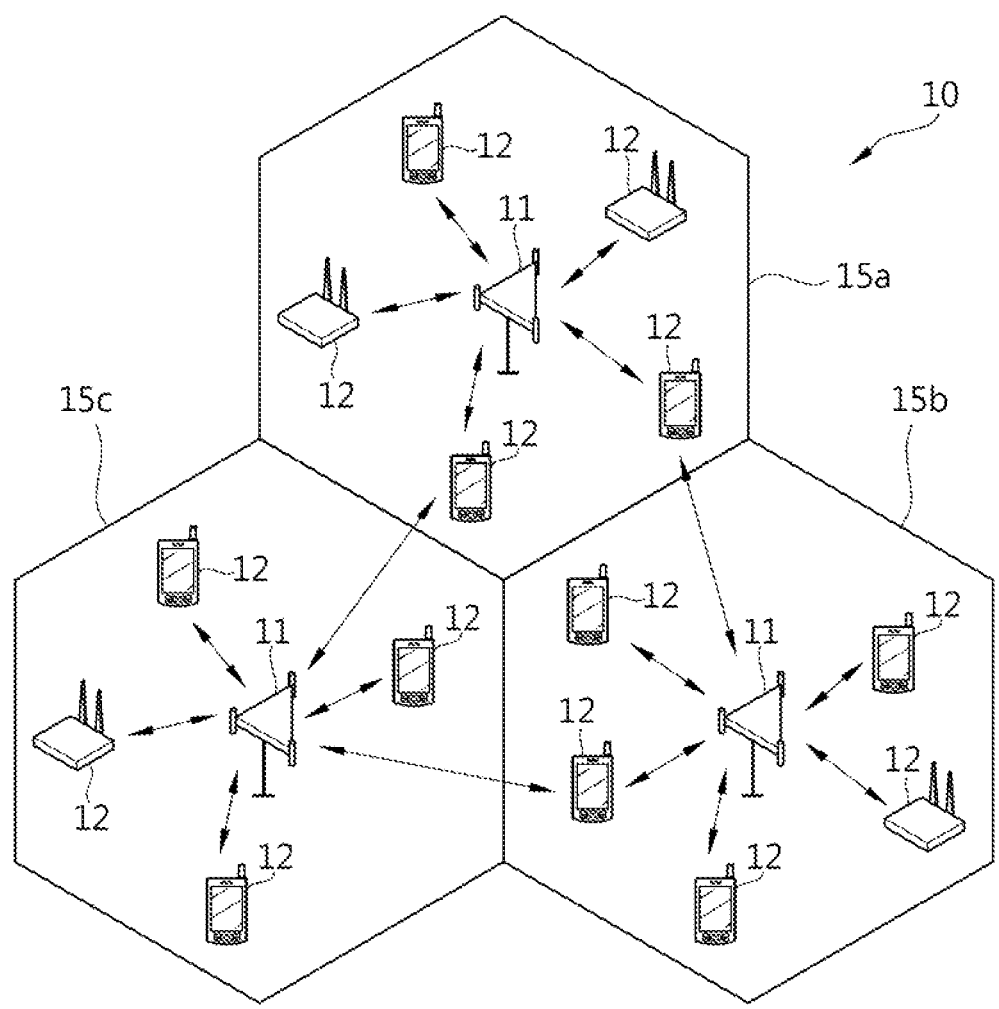
FIG. 1 shows a wireless communication system.

FIG. 1 shows a wireless communication system.

Referring to FIG. 1, the wireless communication system 10 includes one or more base stations (BSs) 11. The BSs 11 provide communication services to respective geographical areas (in general called 'cells') 15a, 15b, and 15c. Each of the cells can be divided into a number of areas (called 'sectors'). A user equipment (UE) 12 can be fixed or mobile and may be referred to as another terminology, such as a mobile station (MS), a mobile terminal (MT), a user terminal (UT), a subscriber station (SS), a wireless device, a personal digital assistant (PDA), a wireless modem, or a handheld device. In general, the BS 11 refers to a fixed station that communicates with the UEs 12, and it may be referred to as another terminology, such as an evolved-NodeB (eNB), a base transceiver system (BTS), or an access point.

The UE generally belongs to one cell. A cell to which a UE belongs is called a serving cell. A BS providing the serving cell with communication services is called a serving BS. A wireless communication system is a cellular system, and so it includes other cells neighboring a serving cell. Other cells neighboring the serving cell are called neighbor cells. A BS providing the neighbor cells with communication services is called as a neighbor BS. The serving cell and the neighbor cells are relatively determined on the basis of a UE.

This technology can be used in the downlink (DL) or the uplink (UL). In general, DL refers to communication from the BS 11 to the UE 12, and UL refers to communication from the UE 12 to the BS 11. In the DL, a transmitter may be part of the BS 11 and a receiver may be part of the UE 12. In the UL, a transmitter may be part of the UE 12 and a receiver may be part of the BS 11.

Figure 2:
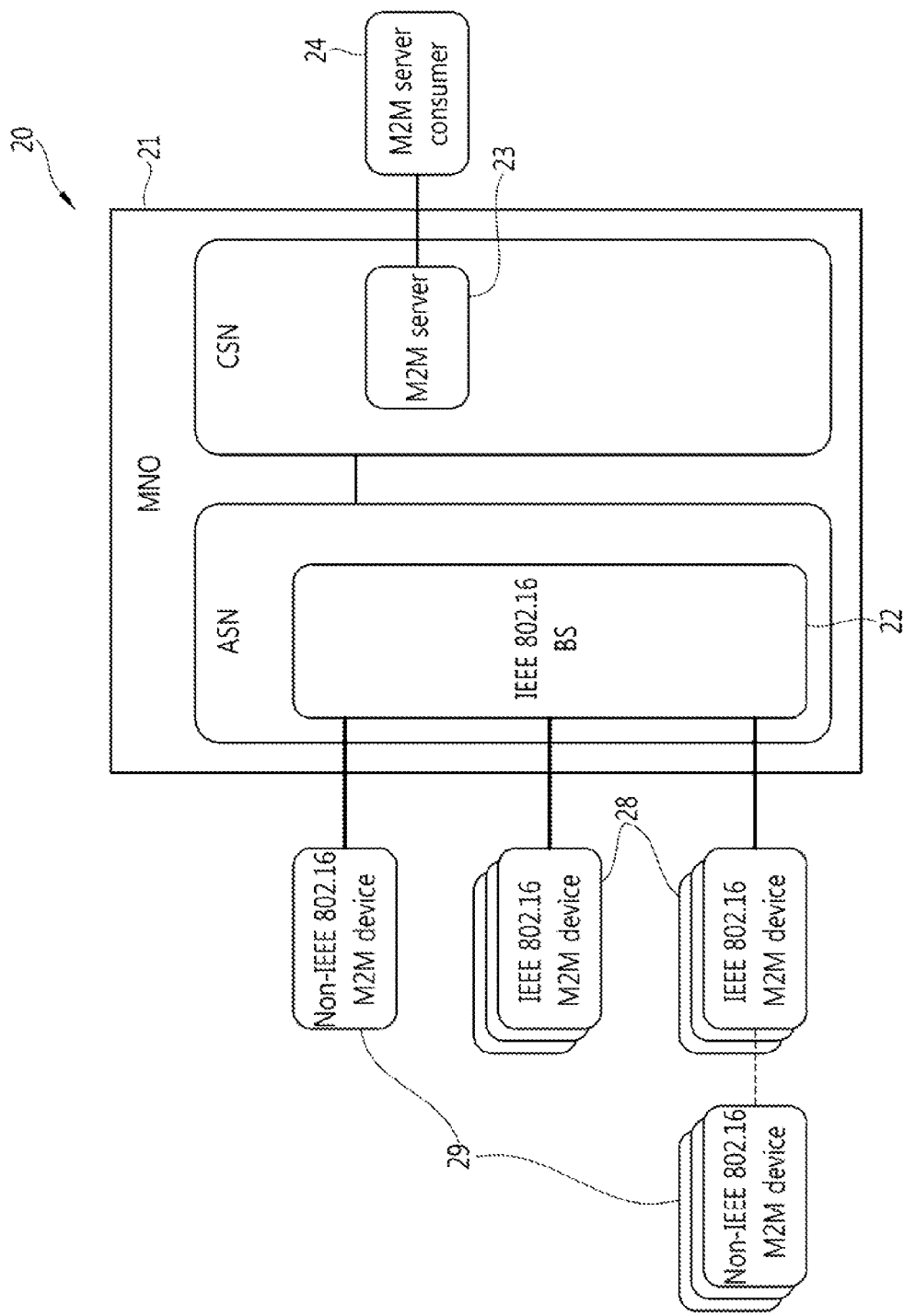
FIG. 2 shows basic machine-to-machine (M2M) service system architecture of IEEE 802.16 supporting M2M communication.

FIG. 2 shows basic machine-to-machine (M2M) service system architecture of IEEE 802.16 supporting M2M communication.

A basic M2M service system architecture 20 includes a mobile network operator (MNO) 21, a M2M service consumer 24, at least one IEEE 802.16 M2M device (hereinafter, 802.16 M2M device) 28, and at least one non-IEEE 802.16 M2M device 29. The MNO 21 includes an access service network (ASN) and a connectivity service network (CSN). The 802.16 M2M device 28 is an IEEE 802.16 mobile station (MS) having a M2M functionality. A M2M server 23 is an entity for communicating with one or more 802.16 M2M devices 28. The M2M server 23 has an interface accessibly by the M2M service consumer 24. The M2M service consumer 24 is a user of a M2M service. The M2M server 23 may be located inside or outside the CSN, and can provide a specific M2M service to the one or more 802.16 M2M devices 28. The ASN may include an IEEE 802.16 base station (BS) 22. A M2M application operates based on the 802.16 M2M device 28 and the M2M server 23.

The basic M2M service system architecture 20 supports two types of M2M communication, i.e., M2M communication between one or more 802.16 M2M devices and a M2M server or point-to-multipoint communication between the 802.16 M2M devices and an IEEE 802.16 BS. The basic M2M service system architecture of FIG. 2 allows the 802.16 M2M device to operate as an aggregation point for a non-IEEE 802.16 M2M device. The non-IEEE 802.16 M2M device uses a radio interface different from IEEE 802.16 such as IEEE 802.11, IEEE 802.15, PLC, or the like. In this case, the non-IEEE 802.16 M2M device is not allowed to change the radio interface to IEEE 802.16.

Figure 3:
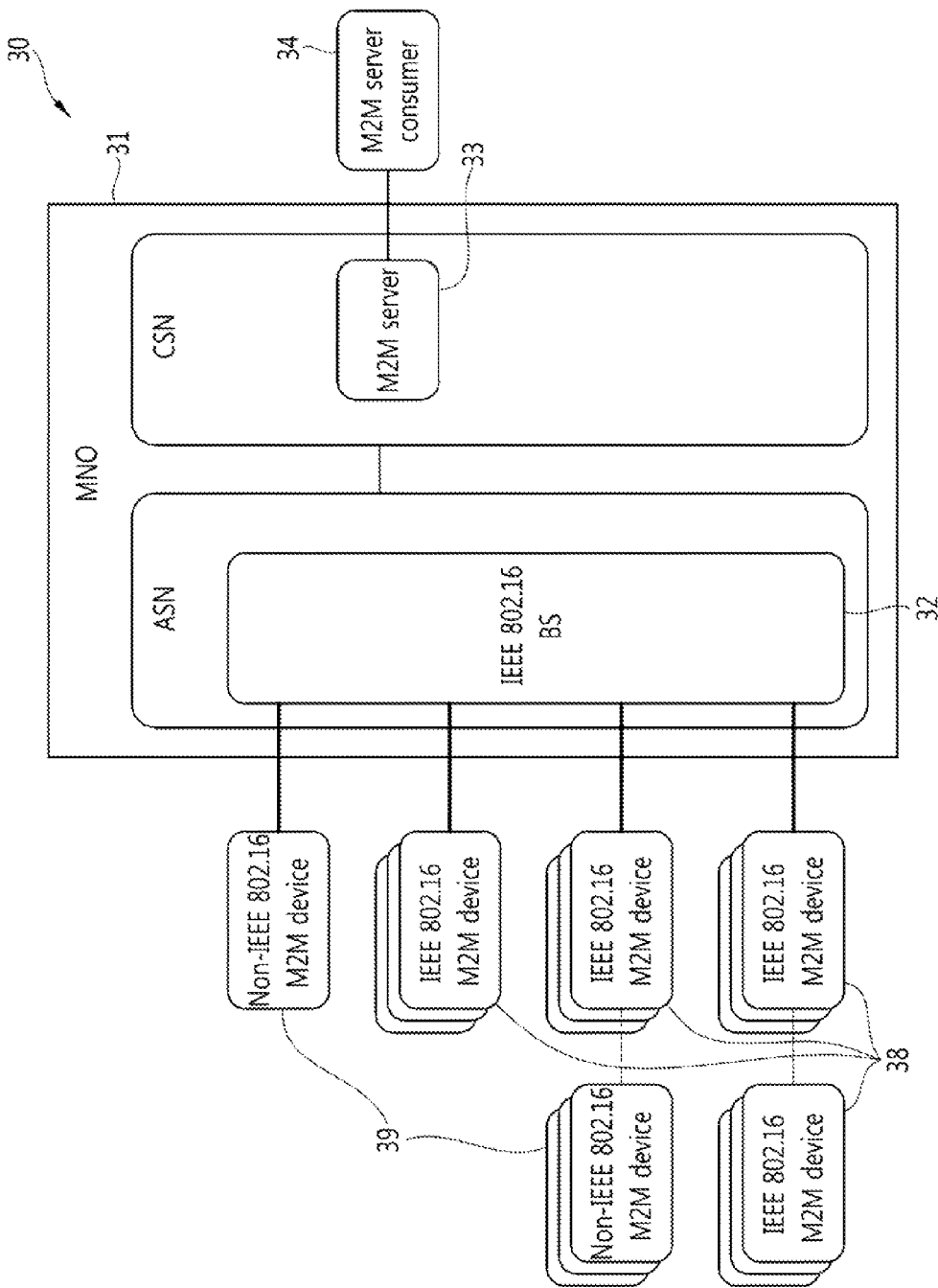
FIG. 3 shows advanced machine-to-machine (M2M) service system architecture of IEEE 802.16 supporting M2M communication.

FIG. 3 shows advanced machine-to-machine (M2M) service system architecture of IEEE 802.16 supporting M2M communication.

In the advanced M2M service system architecture, an 802.16 M2M device can operate as an aggregation point for a non-IEEE 802.16 M2M device, and also can operate as an aggregation point for an 802.16 M2M device. In this case, in order to perform an aggregation function for the 802.16 M2M device and the non-802.16 M2M device, the radio interface can be changed to IEEE 802.16. In addition, the advanced M2M service system architecture can support a peer-to-peer (P2P) connection between 802.16 M2M devices. In this case, the P2P connection can be established on either IEEE 802.16 or another radio interface such as IEEE 802.11, IEEE 802.15, PLC, or the like.

Figure 4:
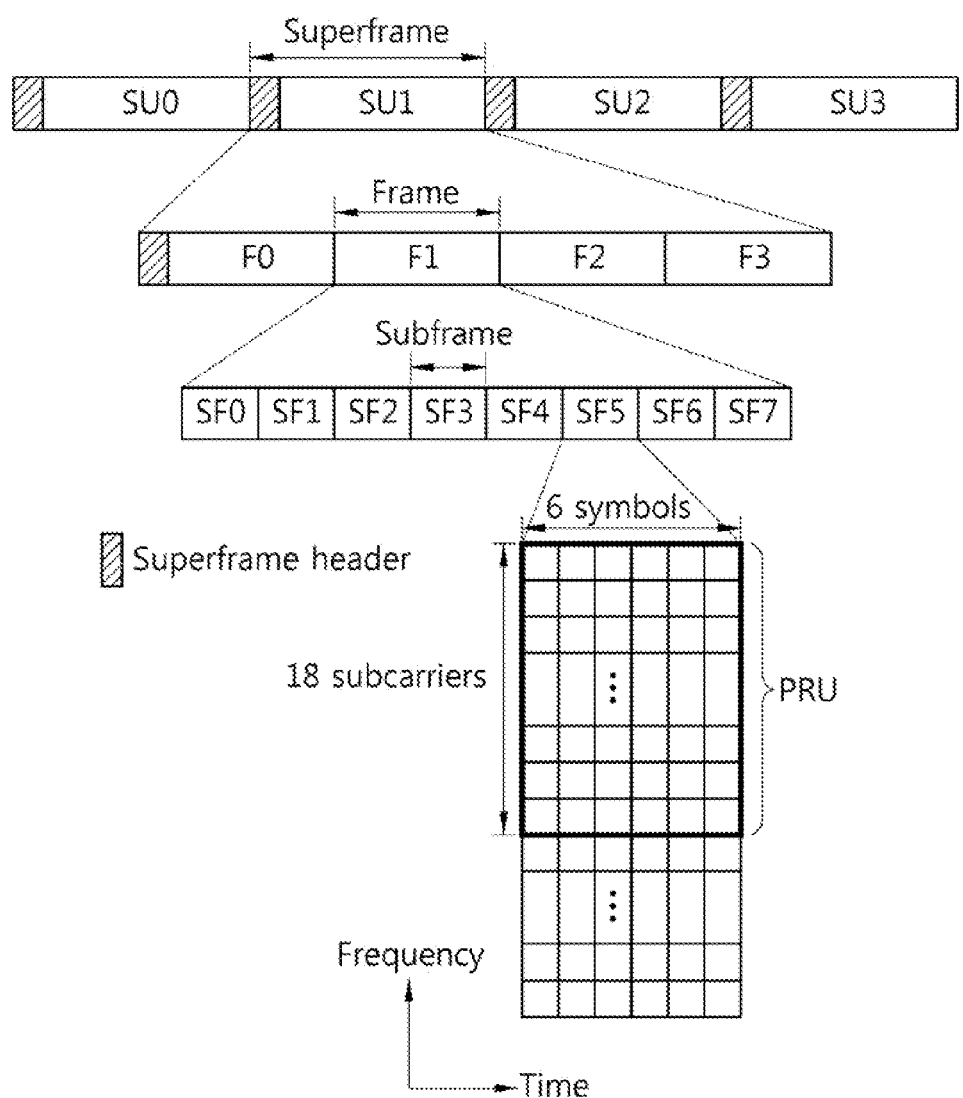
FIG. 4 shows an example of an IEEE 802.16m frame structure.

FIG. 4 shows an example of an IEEE 802.16m frame structure.

Referring to FIG. 4, a superframe (SF) includes a superframe header (SFH) and four frames F0, F1, F2, and F3. Each frame may have the same length in the SF. Although it is shown that each SF has a size of 20 milliseconds (ms) and each frame has a size of 5 ms, example embodiments of the present invention is not limited thereto. A length of the SF, the number of frames included in the SF, the number of SFs included in the frame, or the like may change variously. The number of SFs included in the frame may change variously according to a channel bandwidth and a cyclic prefix (CP) length.

One frame includes 8 subframes SF0, SF1, SF2, SF3, SF4, SF5, SF6, and SF7. Each subframe can be used for UL or DL transmission. One subframe includes a plurality of orthogonal frequency division multiplexing (OFDM) symbols or orthogonal frequency division multiple access (OFDMA) symbols in a time domain, and includes a plurality of subcarriers in a frequency domain. An OFDM symbol is for representing one symbol period, and can be referred to as other terminologies such as an OFDMA symbol, an SC-FDMA symbol, etc., according to a multiple access scheme. The subframe can consist of 5, 6, 7, or 9 OFDMA symbols. However, this is for exemplary purposes only, and thus the number of OFDMA symbols included in the subframe is not limited thereto. The number of OFDMA symbols included in the subframe may change variously according to a channel bandwidth and a CP length. A subframe type may be defined according to the number of OFDMA symbols included in the subframe. For example, it can be defined such that a type-1 subframe includes 6 OFDMA symbols, a type-2 subframe includes 7 OFDMA symbols, a type-3 subframe includes 5 OFDMA symbols, and a type-4 subframe includes 9 OFDMA symbols. One frame may include subframes each having the same type. Alternatively, one frame may include subframes each having a different type. That is, the number of OFDMA symbols included in each subframe may be identical or different in one frame. Alternatively, the number of OFDMA symbols included in at least one subframe of one frame may be different from the number of OFDMA symbols of the remaining subframes of the frame.

Time division duplex (TDD) or frequency division duplex (FDD) can be applied to the frame. In the TDD, each subframe is used in UL or DL transmission at the same frequency and at a different time. That is, subframes included in a TDD frame are divided into a UL subframe and a DL subframe in the time domain. In the FDD, each subframe is used in UL or DL transmission at the same time and at a different frequency. That is, subframes included in an FDD frame are divided into a UL subframe and a DL subframe in the frequency domain. UL transmission and DL transmission occupy different frequency bands and can be simultaneously performed.

A superframe header (SFH) can carry an essential system parameter and system configuration information. The SFH may be located in a first subframe in a superframe. The SFH may occupy last 5 OFDMA symbols of the first subframe. The SFH can be classified into a primary-SFH (P-SFH) and a secondary-SFH (S-SFH). The P-SFH may be transmitted in every superframe. Information transmitted on the S-SFH can be divided into 3 sub-packets, i.e., S-SFH SP1, S-SFH SP2, and S-SFH SP3. Each sub-packet can be transmitted periodically with a different periodicity. Information transmitted through the S-SFH SP1, the S-SFH SP2, and the S-SFH SP3 may be different from one another. The S-SFH SP1 may be transmitted with the shortest period, and the S-SFH SP3 may be transmitted with the longest period. The S-SFH SP1 includes information on network re-entry, and a transmission period of the S-SFH SP1 may be 40 ms. The S-SFH SP2 includes information on initial network entry and network discovery, and a transmission period of the S-SFH SP2 may be 80 ms. The S-SFH SP3 includes other important system information, and a transmission period of the S-SFH SP3 may be either 160 ms or 320 ms.

One OFDMA symbol includes a plurality of subcarriers, and the number of subcarriers is determined according to a fast Fourier transform (FFT) size. There are several types of subcarriers. A subcarrier type may include a data subcarrier for data transmission, a pilot subcarrier for various estimations, and a null carrier for a guard band and a DC carrier. A parameter for characterizing an OFDMA symbol includes BW, $N_{used}$, n, G, etc. BW denotes a nominal channel bandwidth. $N_{used}$ denotes the number of subcarriers in use (including a DC subcarrier). n denotes a sampling factor. This parameter is used to determine a subcarrier spacing and a useful symbol time together with BW and $N_{used}$. G denotes a ratio of a CP time and a useful time.

Table 1 below shows an OFDMA parameter.

TABLE 1

| | | | 5 | 7 | 8.75 | 10 | 20 |
|---|---|---|---|---|---|---|---|
| Channel bandwidth, BW (MHz) | | | 5 | 7 | 8.75 | 10 | 20 |
| Sampling factor, n | | | 28/25 | 8/7 | 8/7 | 28/25 | 28/25 |
| Sampling frequency, $F_s$ (MHz) | | | 5.6 | 8 | 10 | 11.2 | 22.4 |
| FFT size, $N_{FFT}$ | | | 512 | 1024 | 1024 | 1024 | 2048 |
| Subcarrier spacing, $\Delta f$ (kHz) | | | 10.94 | 7.81 | 9.77 | 10.94 | 10.94 |
| Useful symbol time, $T_b$ (µs) | | | 91.4 | 128 | 102.4 | 91.4 | 91.4 |
| G = 1/8 | Symbol time, $T_s$ (µs) | | 102.857 | 144 | 115.2 | 102.857 | 102.857 |
| | FDD | Number of ODFMA symbols per 5 ms frame | 48 | 34 | 43 | 48 | 48 |
| | | Idle time (µs) | 62.857 | 104 | 46.40 | 62.857 | 62.857 |
| | TDD | Number of ODFMA symbols per 5 ms frame | 47 | 33 | 42 | 47 | 47 |
| | | TTG + RTG (µs) | 165.714 | 248 | 161.6 | 165.714 | 165.714 |
| G = 1/16 | Symbol time, $T_s$ (µs) | | 97.143 | 136 | 108.8 | 97.143 | 97.143 |
| | FDD | Number of ODFMA symbols per 5 ms frame | 51 | 36 | 45 | 51 | 51 |
| | | Idle time (µs) | 45.71 | 104 | 104 | 45.71 | 45.71 |
| | TDD | Number of ODFMA symbols per 5 ms frame | 50 | 35 | 44 | 50 | 50 |
| | | TTG + RTG (µs) | 142.853 | 240 | 212.8 | 142.853 | 142.853 |
| G = 1/4 | Symbol time, $T_s$ (µs) | | 114.286 | 160 | 128 | 114.286 | 114.286 |
| | FDD | Number of ODFMA symbols per 5 ms frame | 43 | 31 | 39 | 43 | 43 |
| | | Idle time (µs) | 85.694 | 40 | 8 | 85.694 | 85.694 |
| | TDD | Number of ODFMA symbols per 5 ms frame | 42 | 30 | 38 | 42 | 42 |
| | | TTG + RTG (µs) | 199.98 | 200 | 136 | 199.98 | 199.98 |
| Number of Guard subcarriers | Left | | 40 | 80 | 80 | 80 | 160 |
| | Right | | 39 | 79 | 79 | 79 | 159 |
| Number of used subcarriers | | | 433 | 865 | 865 | 865 | 1729 |
| Number of PRU in type-1 subframe | | | 24 | 48 | 48 | 48 | 96 |

In Table 1, $N_{FFT}$ is smallest power of two greater than $N_{used}$. A sampling factor $F_s$ is floor(n·BW/8000)×8000, a subcarrier spacing Δf is $F_s/N_{FFT}$, a useful symbol time $T_b$ is 1/Δ, a CP time $T_g$ is G·$T_b$, an OFDMA symbol time $T_s$ is $T_b+T_g$, and a sampling time is $T_b/N_{FFT}$.

Hereinafter, a paging message will be described.

A paging message is a mobile station (MS) notification message which either indicates the presence of DL traffic pending for the specified MS or polls an MS for requesting a location update without requiring a full network entry. The paging message can be broadcast. The Paging message may include the information for multiple MSs. The paging message may include identification of the MSs to be notified of pending DL traffic and location update. The Paging message may also include an action code directing each MS notified via the inclusion of its identifier.

Table 2 shows an example of part of a paging message (i.e., AAI-PAG-ADV message) for the M2M device which is a paging message of IEEE 802.16p.

Group paging may be used for M2M devices. For this, M2M group identifier (MGID) along with a zone index of the associated M2M group zone may be included in a paging message instead of an individual identifier to identify the group of M2M devices. Referring to Table 2, AAI-PAG-ADV message includes an MGID field and a Zone Index field. The M2M device follows the paging cycle for monitoring both individual paging and group paging.

An M2M group zone is a logical zone comprising of multiple BSs. The M2M group zone is identified by an M2M group zone ID. The M2M group zone ID may be broadcasted in a system configuration descriptor message (AAI-SCD message). The MGID is a 12-bit value that uniquely identifies a downlink multicast service flow shared by a group of M2M devices within an M2M group zone. An M2M device group is addressed using the MGID and the corresponding M2M group zone index. All MGIDs that are assigned to an M2M device belongs to the same M2M group zone.

A FMDID is assigned to a fixed M2M device by the BS during idle mode entry and released during the network reen-

TABLE 2

| Field | Size (bit) | Value/Description | Condition |
|---|---|---|---|
| ... | | | |
| For (i=0; i<M; i++) { | | M equals the number of bits in Paging_Group_IDs bit-map whose bit is set to 1. | Present only for M2M devices |
| For (j=0; j<Num_devices; j++) { | | Num_devices indicates the number of paged M2M devices in a corresponding paging group [1 ... 32] | |
| Deregistration Identifier (DID) | 18 | Used to indicate Deregistration ID for the M2M device to be paged (Deregistration Identifier and Paging Cycle are used to identify each paged M2M device) [0 ... 2^18 − 1] | Present if the S-SFH Network Configuration bit == 0b0 |
| Action Code | 1 | Used to indicate the purpose of the AAI-PAG-ADV message 0b0: perform network reentry 0b1: perform ranging for location update | |
| } // End of for (j=0;j<Num_devices;j++) } // End of for (i=0; i<M; i++) | | | |
| For (i=0; i<Num_MGID; i++) { | | Num_MGID indicates the number of MGIDs included in this paging message [0 ... 63] | Shall be included if the BS sends DL multicast data for M2M after transmission of the AAI-PAG-ADV message. |
| MGID | 12 | M2M Group ID | |
| Zone Index | 2 | Zone Index corresponding to an M2M GROUP ZONE ID based on the implicit ordering of the M2M GROUP ZONE IDs in the broadcasted message | Present if BS is part of more than one M2M group zone. |
| Action Code | 2 | 0b00: Performing network reentry 0b01: Performing location update 0b10: Receiving multicast traffic without requiring network reentry 0b11: MGID re-assignment | |
| For (j=0; j<Num_FMDID; j++) { | | Num_FMDID indicates the number of FMDIDs included in this paging message [1 ... 32] | Shall be included when the BS pages the fixed M2M devices in localized idle mode. |
| Fixed M2M Deregistration ID (FMDID) | 16 | Fixed M2M Deregistration ID | |
| Action Code | 1 | 0: Performing network re entry 1: Performing location update | |
| ... } // End of for (j=0; j<Num_FMDID; j++) ... } | | | | try. A 16-bit value uniquely identifies a fixed M2M device in domain of the BS. The BS may assign a new FMDID to a fixed M2M device during location update procedure.

The BS shall not transmit any DL traffic or the paging message to the M2M device during a paging unavailable interval. During the paging unavailable interval, the M2M device may power down, scan neighbor BSs, select a preferred BS, conduct ranging, or perform other activities for which the M2M device will not guarantee availability to any BS for DL traffic.

The BS transmits the paging message within a specified frame. The M2M device derives the start of a paging listening interval based on a paging cycle and a paging offset. The length of the paging listening interval is one superframe per paging cycle. The BS shall transmit a PGID-Info message at a predetermined location in the paging listening interval in order to advertise the paging group(s) that is supported by the BS. The PGID-Info message is transmitted by the BS regardless of whether or not there is any notification for M2M devices. The Table 3 shows an example of part of the PGID-Info message.

TABLE 3

| Field | Size (bit) | Value/Description | Condition |
|---|---|---|---|
| For(i=0; i<Num__PGIDs; i++) { | | Indicate the number of PGID included in PGID-Info message [1 ... 4] | |
| PGID | 16 | Indicate Paging group identifier where the BS belongs [0 ... $2^{16}$ − 1] | Shall be present |
| ... | | | |

The M2M device monitors a pre-determined frame for the paging message. The pre-determined frame $N_{paging\ frame}$ for the M2M device is implicitly determined according to Equation 1 below.

$$N_{paging\ frame} = (\text{M2M device's DID}) \bmod m, \text{ where } m = 1 \text{ or } 2 \text{ or } 3 \text{ or } 4 \quad \text{<Equation 1>}$$

In Equation 1, m is indicated by the BS using the PGID-Info message. For a fixed M2M device, DID in Equation may be replaced with FMDID.

After receiving the complete paging message, the idle mode M2M devices returns to paging unavailable interval if the M2M device is not paged.

A proposed receiving method of a paging message according to an embodiment of the present invention will be described.

Figure 5:
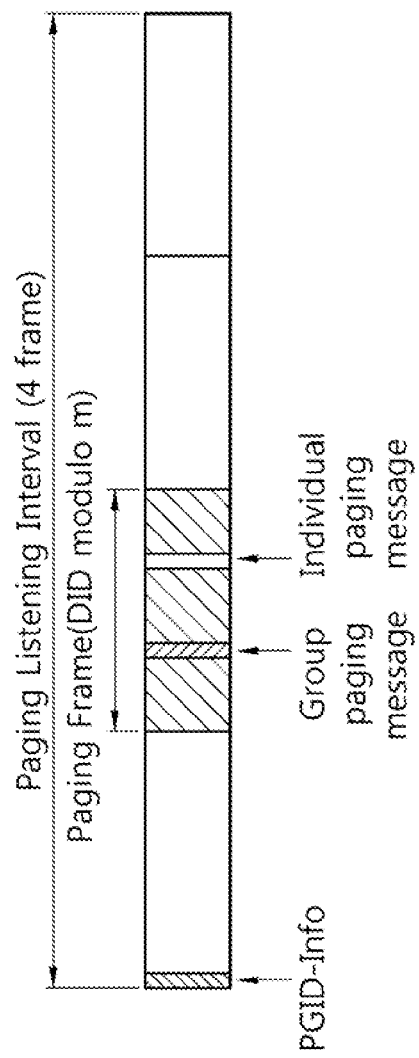
FIG. 5 shows an example of a method of receiving a paging message according to an embodiment of the present invention.

FIG. 5 shows an example of a method of receiving a paging message according to an embodiment of the present invention. FIG. 5 shows a case where an M2M device is a mobile M2M device. A DID may be allocated to the mobile M2M device.

Referring to FIG. 5, the mobile M2M device may receive a PGID-Info message from a first frame of a paging listening interval to confirm 'm'. The mobile M2M device may monitor a paging message from a paging frame having an index satisfying (Paging frame=DID modulo m) in the paging listening interval. The mobile M2M device may receive group paging message and an individual paging message in the paging listening frame. Even if receiving one message of a group paging message and an individual paging message, the mobile M2M device may monitor a paging message remaining in the page frame until receiving a paging message which is not received yet in order to receive both of the group paging message and the individual paging message in the paging frame.

Or, the BS may firstly transmit the group paging message in the page frame to the mobile M2M device before the individual paging message. Because the paging frame indicates a paging frame to which an individual paging message is transmitted, the mobile M2M device receives individual paging message, and enter a paging unavailable interval regardless of presence of transmission of a group paging message. In order the mobile M2M device for receiving both the group paging message and the individual paging message, the BS may firstly transmit the group paging message to the mobile M2M device, and transmit the individual paging message to the mobile M2M device. Accordingly, the mobile M2M device may receive the individual paging message and directly enter the paging unavailable interval.

Figure 6:
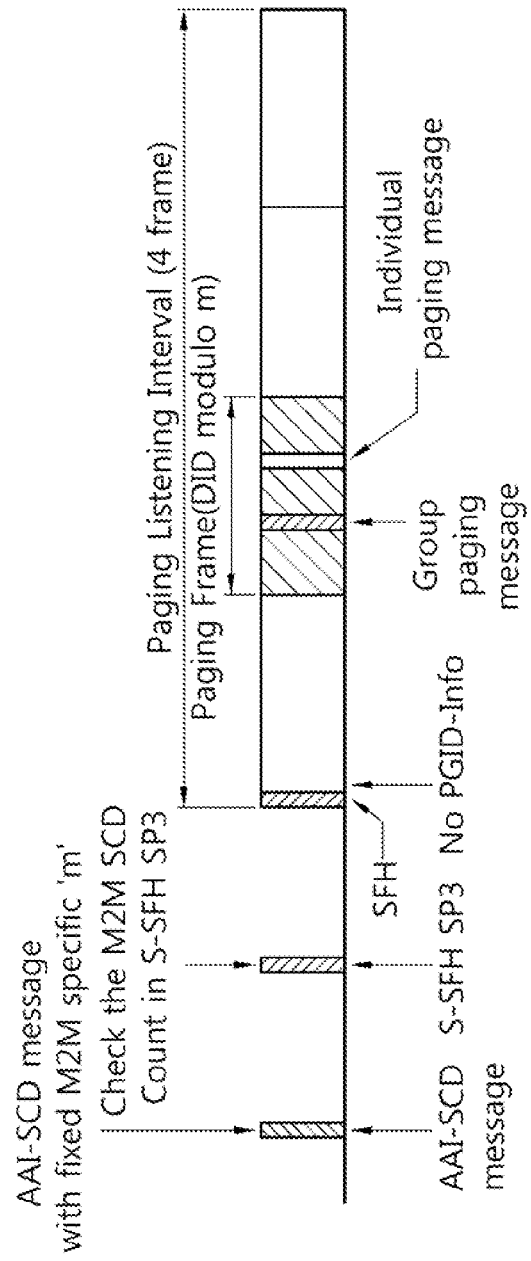
FIG. 6 shows another example of a method of receiving a paging message according to an embodiment of the present invention.

FIG. 6 shows another example of a method of receiving a paging message according to an embodiment of the present invention. FIG. 6 shows a case where an M2M device is a fixed M2M device. An FMDID may be allocated to the fixed M2M device. Referring to FIG. 6, unlike FIG. 5, the fixed M2M device does not receive a PGID-info message. The BS may not transmit the PGID-Info message to the fixed M2M device. Accordingly, the fixed M2M device cannot determine paging frame monitoring the paging message using m received through the PGID-Info message.

Accordingly, there may be suggested a method of adding a fixed M2M device specific m value to an AAI-SCD message for the fixed M2M device and transmitting the AAI-SCD message to the fixed M2M device. Referring to FIG. 6, the fixed M2M device may determine whether the AAI-SCD message is updated before a paging listening interval. That is, the fixed M2M device may previously confirm an S-SFH SP3 before the paging listening interval to determine whether the AAI-SCD message is updated. The fixed M2M device may confirm an M2M SCD count of an S-SFH SF3 instructing that an M2M related parameter of the AAI-SCD message is changed. If an M2M SCD count of an S-SFH SP3 is not changed, the fixed M2M device may monitor a paging message from a paging frame having an index satisfying (Paging frame=FMDID modulo fixed M2M device specific m) in the paging listening interval. The fixed M2M device may receive a group paging message and an individual paging message in the paging frame. To receive both the group paging message and the individual paging message in the paging frame, even if receiving one of the group paging message and the individual paging message in a corresponding, the fixed M2M device may monitor the paging message remaining in the page frame until receiving the page message which is not received.

The BS may firstly transmit the group paging message ahead of the individual paging message to the fixed M2M device. Because the paging frame indicates a paging frame to which the individual paging message is transmitted, the fixed M2M device may receive the individual paging message and enter the paging unavailable interval regardless of presence of transmission of the group paging message. Accordingly, in order the fixed M2M device for receiving both of the group paging message and the individual paging message, the BS may firstly transmit the group paging message to the fixed M2M device, and then transmit the individual paging message to the fixed M2M device. Accordingly, the fixed M2M device may receive the individual paging message and directly enter the paging unavailable interval.

Figure 7:
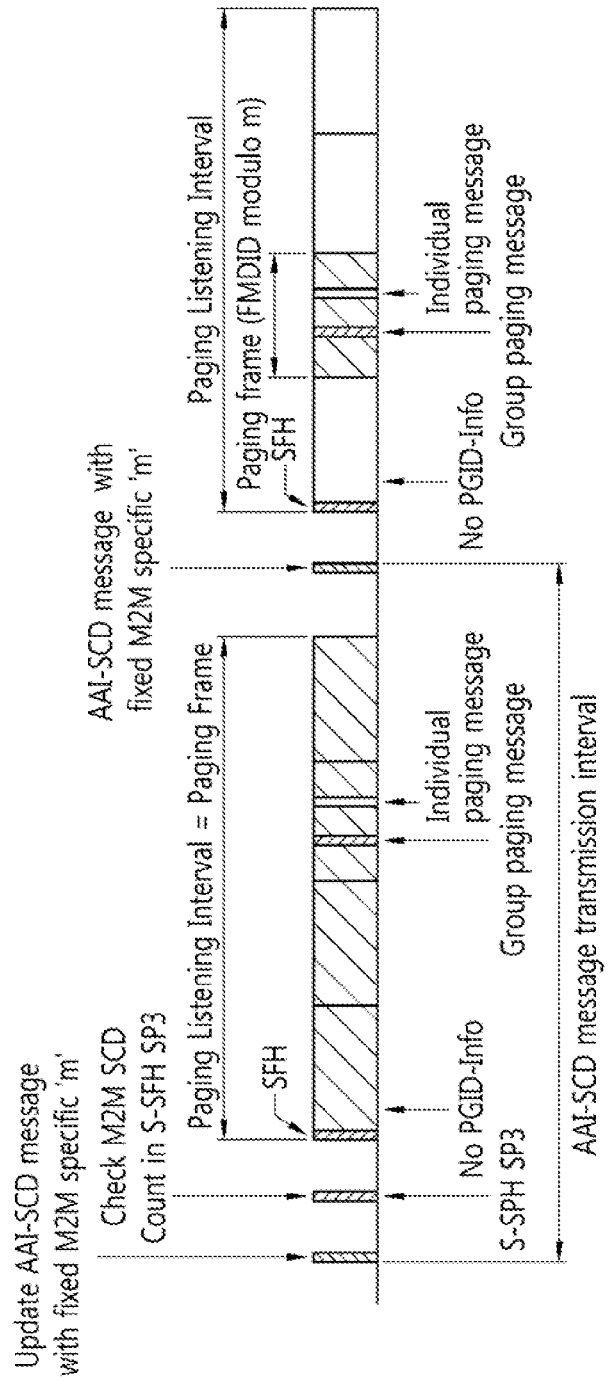
FIG. 7 shows another example of a method of receiving a paging message according to an embodiment of the present invention.

FIG. 7 shows another example of a method of receiving a paging message according to an embodiment of the present invention. FIG. 7 shows a case where an M2M device is a fixed M2M device as in the FIG. 6. An FMDID may be allocated to the fixed M2M device. Referring to FIG. 6, the fixed M2M device may not determine a paging frame monitoring the paging message using me received through a PGID-Info message. Accordingly, there may be suggested a method of adding a fixed M2M specific 'm' value to an AAI-SCD message for the fixed M2M device and transmitting the AAI-SCD message to the fixed M2M device.

Referring to FIG. 7, the fixed M2M device may determine whether an AAI-SCD message is updated before a paging listening interval. That is, the fixed M2M device may previously confirm an S-SFH SP3 before the paging listening interval to determine whether the AAI-SCD message is updated. The fixed M2M device may confirm a M2M SCD count of an S-SFH SF3 instructing whether an M2M relation parameter of the AAI-SCD message is changed. If an M2M SCD count of the S-SFH SP3 is changed, the fixed M2M device may monitor the paging message during a paging listening interval (1 superframe). The fixed M2M device may monitor a paging message in a paging frame having an index satisfying (Paging frame=FMDID modulo fixed M2M device specific m) within the paging listening interval after receiving an updated AAI-SCD message to update changed fixed M2M device specific m.

Figure 8:
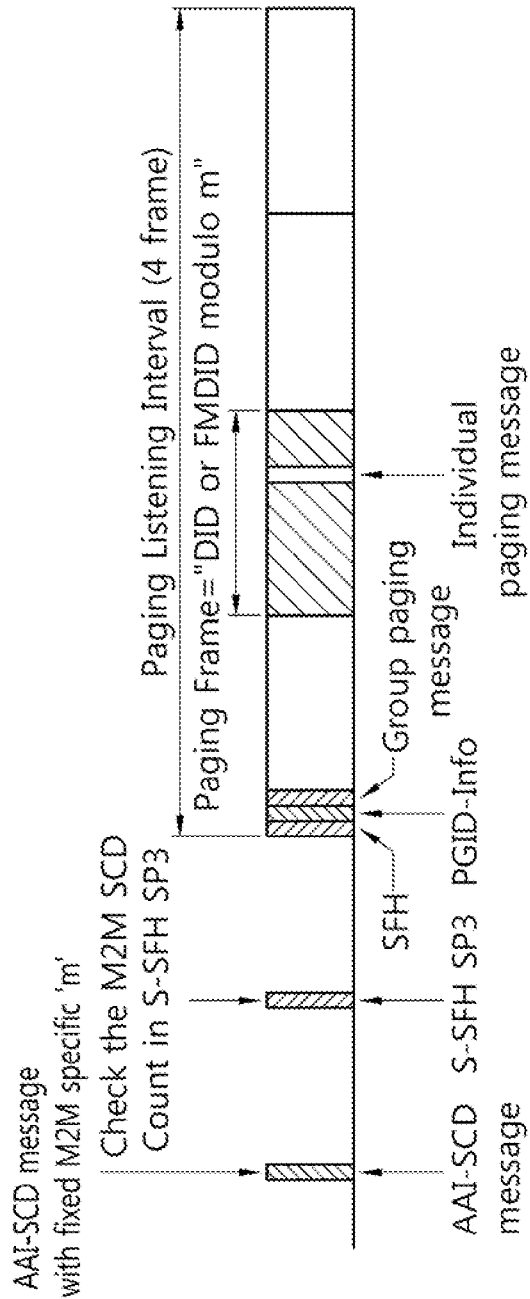
FIG. 8 shows another example of a method of receiving a paging message according to an embodiment of the present invention.

FIG. 8 shows another example of a method of receiving a paging message according to an embodiment of the present invention.

Referring to FIG. 8, the BS may transmit the group paging message to an M2M device in a first frame in a paging listening interval of the M2M device. When transmitting the group paging message through a paging frame having an index satisfying (DID or FMDID modulo m), there is a possibility that the same group paging message is repeatedly transmitted through 4 frames in a superframe. Accordingly, to prevent signaling overhead, the BS may transmit the group paging message in the first frame of the paging listening interval of the M2M device.

The M2M device may monitor an S-SFH, a PGID-info message (case of mobile M2M device) or an AAI-SCD message (case of fixed M2M device) and the group paging message in the paging listening interval. The M2M device may monitor the individual paging message in a paging frame having an index satisfying (DID or FMDID modulo m).

Figure 9:
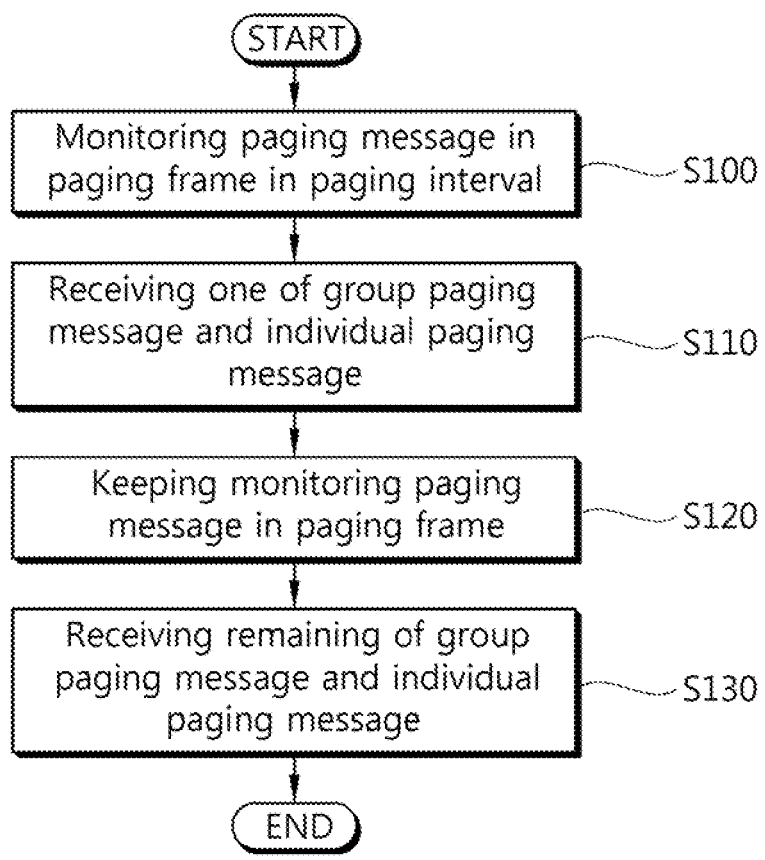
FIG. 9 shows another example of a method of receiving a paging message according to an embodiment of the present invention.

FIG. 9 shows another example of a method of receiving a paging message according to an embodiment of the present invention.

At step S100, the M2M device monitors a paging message in a paging frame in a paging listening interval. At step S110, the M2M device receives one of a group paging message and an individual paging message. At step S120, the M2M device keeps monitoring the paging message in the paging frame in the paging listening interval. At step S130, the M2M device receives the remaining of the group paging message and the individual paging message.

Figure 10:
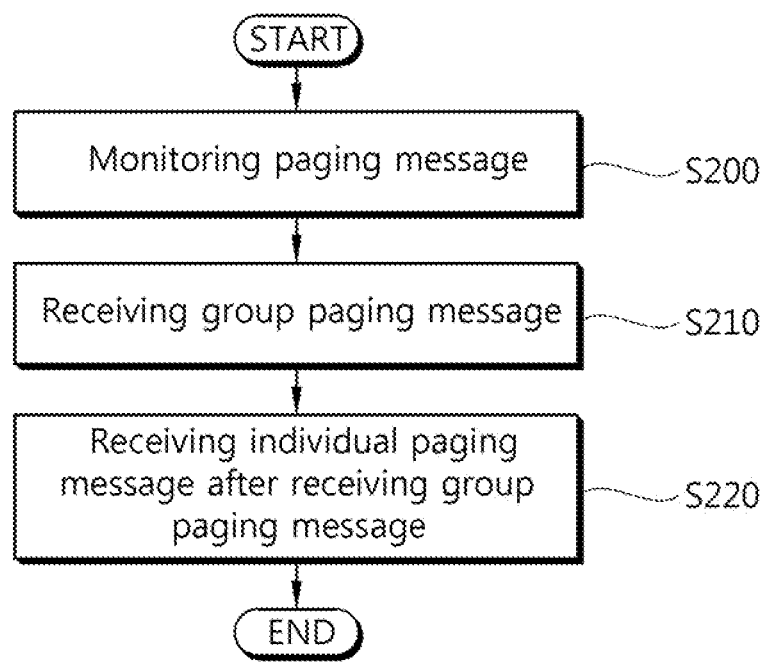
FIG. 10 shows another example of a method of receiving a paging message according to an embodiment of the present invention.

FIG. 10 shows another example of a method of receiving a paging message according to an embodiment of the present invention.

At step S200, the M2M device monitors a paging message. At step S210, the M2M device receives a group paging message. At step S220, the M2M device receives an individual paging message after receiving the group paging message.

Figure 11:
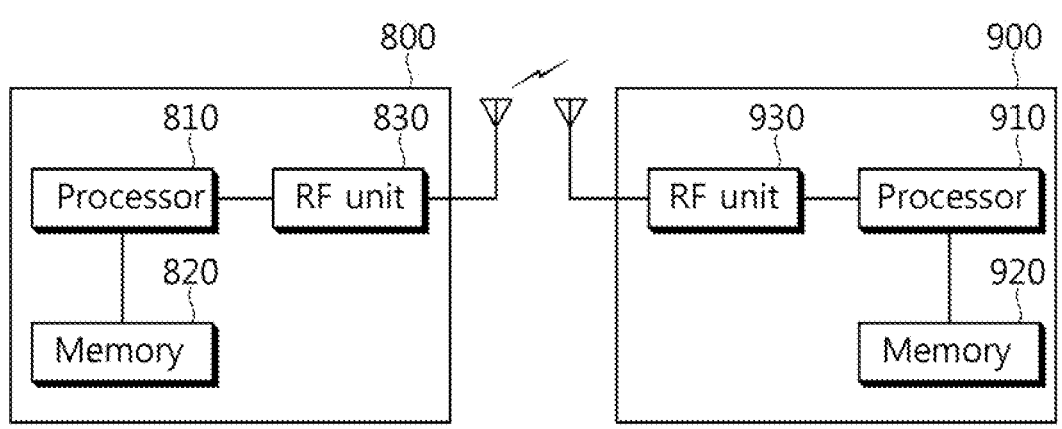
FIG. 11 shows a block diagram showing wireless communication system to implement an embodiment of the present invention.

FIG. 11 shows a block diagram showing wireless communication system to implement an embodiment of the present invention.

A BS 800 may include a processor 810, a memory 820 and a radio frequency (RF) unit 830. The processor 810 may be configured to implement proposed functions, procedures and/or methods described in this description. Layers of the radio interface protocol may be implemented in the processor 810. The memory 820 is operatively coupled with the processor 810 and stores a variety of information to operate the processor 810. The RF unit 830 is operatively coupled with the processor 810, and transmits and/or receives a radio signal.

An M2M device 900 may include a processor 910, a memory 920 and a RF unit 930. The processor 910 may be configured to implement proposed functions, procedures and/or methods described in this description. Layers of the radio interface protocol may be implemented in the processor 910. The memory 920 is operatively coupled with the processor 910 and stores a variety of information to operate the processor 910. The RF unit 930 is operatively coupled with the processor 910, and transmits and/or receives a radio signal.

The processors 810, 910 may include application-specific integrated circuit (ASIC), other chipset, logic circuit and/or data processing device. The memories 820, 920 may include read-only memory (ROM), random access memory (RAM), flash memory, memory card, storage medium and/or other storage device. The RF units 830, 930 may include baseband circuitry to process radio frequency signals. When the embodiments are implemented in software, the techniques described herein can be implemented with modules (e.g., procedures, functions, and so on) that perform the functions described herein. The modules can be stored in memories 820, 920 and executed by processors 810, 910. The memories 820, 920 can be implemented within the processors 810, 910 or external to the processors 810, 910 in which case those can be communicatively coupled to the processors 810, 910 via various means as is known in the art.

A false alarm of a paging message can be prevented.

In view of the exemplary systems described herein, methodologies that may be implemented in accordance with the disclosed subject matter have been described with reference to several flow diagrams. While for purposed of simplicity, the methodologies are shown and described as a series of steps or blocks, it is to be understood and appreciated that the claimed subject matter is not limited by the order of the steps or blocks, as some steps may occur in different orders or concurrently with other steps from what is depicted and described herein. Moreover, one skilled in the art would understand that the steps illustrated in the flow diagram are not exclusive and other steps may be included or one or more of the steps in the example flow diagram may be deleted without affecting the scope and spirit of the present disclosure.

What is claimed is:

1. A method of a machine-to-machine (M2M) device receiving a paging message in a wireless communication system, the method comprising:
monitoring paging messages in a paging frame during a paging listening interval, the paging messages including a group paging message and an individual paging message;
receiving one of the group paging message and the individual paging message from a base station (BS);
continuing to monitor the paging messages in the paging frame during the paging listening interval; and
receiving the other of the group paging message and the individual paging message from the BS,
wherein the M2M device is a mobile M2M device to which a deregistration identifier (DID) is assigned, and wherein the paging frame is determined according to the equation:

Paging frame=(DID of the M2M device)modulo $m$, where m is indicated by the BS using a paging group information message (PGID-Info message).

2. The method of claim 1, further comprising receiving a system configuration descriptor message (AAI-SCD message) from the BS.

3. The method of claim 2, wherein whether the AAI-SCD message is updated is determined based on an M2M SCD count in a secondary superframe header (S-SFH) subpacket3 (SP3)

4. A method of receiving a paging message for a machine-to-machine (M2M) device in a wireless communication system, the method comprising:
   monitoring paging messages in a paging frame during a paging interval, the paging messages including a group paging message and an individual paging message;
   receiving the group paging message; and
   receiving the individual paging message after receiving the group paging message,
   wherein the M2M device is a mobile M2M device to which a deregistration identifier (DID) is assigned, and
   wherein the paging frame is determined according to the equation:

Paging frame=(DID of the M2M device)modulo $m$, where m is indicated by the BS using a paging group information message (PGID-Info message).

5. The method of claim 4, further comprising receiving a system configuration descriptor message (AAI-SCD message) from the BS.

6. The method of claim 5, wherein the paging messages are monitored in a paging listening interval only if the AAI-SCD message is updated.

7. The method of claim 5, wherein whether the AAI-SCD message is updated or not is determined based on an M2M SCD count in a secondary superframe header (S-SFH) subpacket3 (SP3).

8. The method of claim 4, wherein the group paging message is received in a first paging frame during the paging listening interval.

* * * * *